June 19, 1962  R. D. RUMSEY  3,039,566
LINEAR HYDRAULIC SHOCK ABSORBER
Filed Jan. 29, 1960  2 Sheets-Sheet 2

Inventor
Rollin Douglas Rumsey by Hill, Sherman, Meroni, Gross & Simpson  Attys

United States Patent Office 3,039,566
Patented June 19, 1962

3,039,566
LINEAR HYDRAULIC SHOCK ABSORBER
Rollin Douglas Rumsey, Buffalo, N.Y., assignor to Houdaille Industries, Inc., Buffalo, N.Y., a corporation of Michigan
Filed Jan. 29, 1960, Ser. No. 5,552
1 Claim. (Cl. 188—88)

This invention relates to shock absorbers of the linear hydraulic type for use on vehicles or the like and more specifically to such direct acting, telescopic, hydraulic dampers including lockout means to provide a substantially rigid mount for gunfire or for other purposes and thus is particularly useful in military vehicles, such as tanks. While the shock absorber of this invention is generally similar to the well known, automotive, telescopic type, preferably it has its reservoir stationary and connected to the upper, and vehicle attached, piston end. In operation, liquid is forced in or out of the reservoir through the hollow piston rod and piston, and through foot valves, which are at its lower end and not, as usual, in the lower end of the barrel or cylinder.

A general object of my invention is to provide an improved form of shock absorber for the purposes as set forth herein and having superior performance and being of low cost in its manufacture.

A further object of my invention is to provide a shock absorber of this type having an improved, remote, electrically actuated lockout means.

Another and more detailed object of my invention is to provide a shock absorber of this type having improved dynamic seals to prevent loss of the working liquid from the working chamber or elsewhere in the unit and to prevent the entry of dirt or water therein.

A still further and more detailed object of my invention is to provide a sturdy design capable of operating under severe conditions through a wide temperature range including temperatures as high as approximately 500° F.

Further detailed objects of my invention include the provision, in shock absorbers of this type, of an improved automatic air bleed system and an improved arrangement for external adjustment of the damping orifice.

These and other objects of the invention will appear from time to time as the following specification proceeds and with reference to the accompanying drawing wherein.

Figure 1:
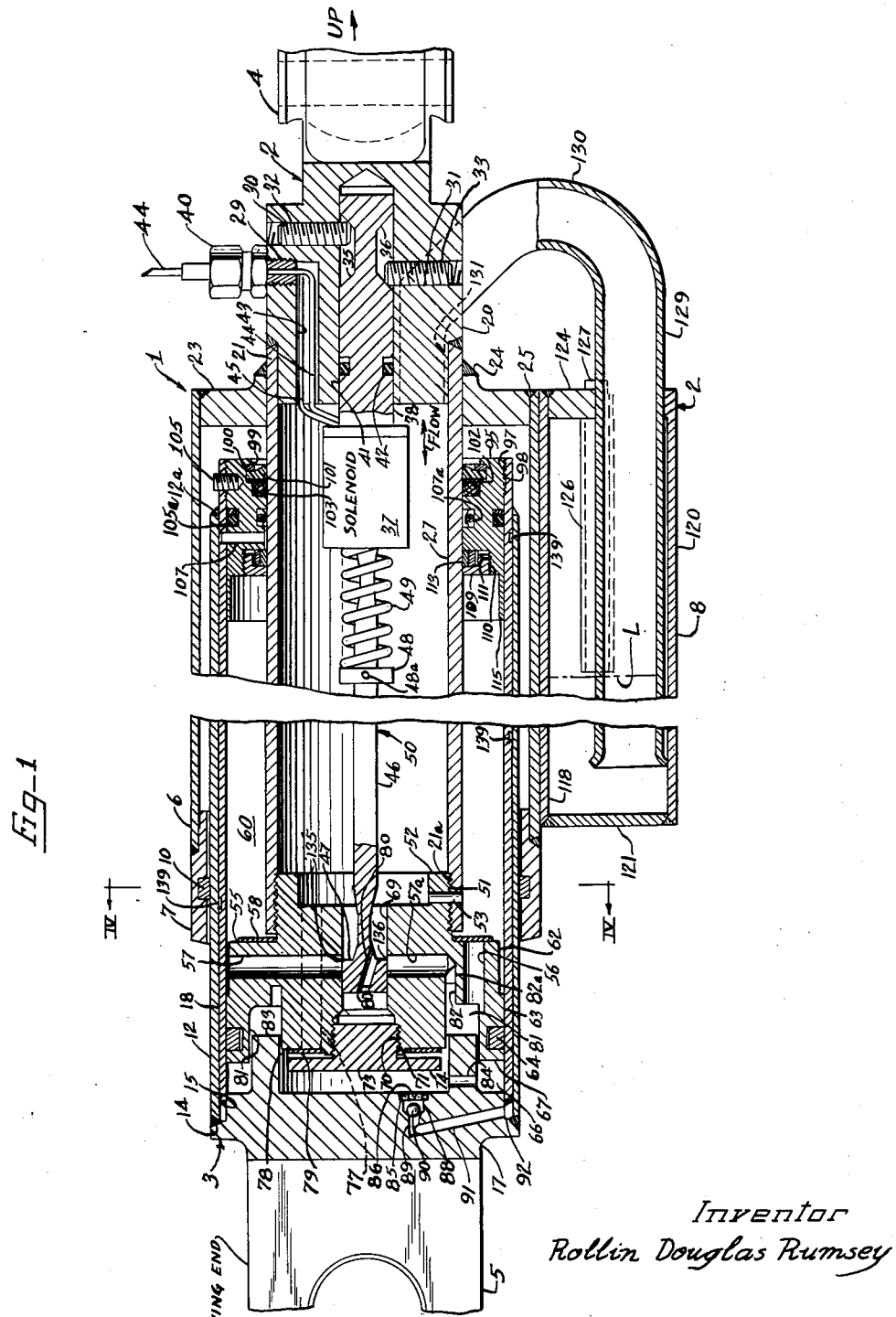
FIGURE 1 is a longitudinal sectional view taken through a shock absorber constructed in accordance with a preferred and exemplary embodiment of my invention.
Figure 2:
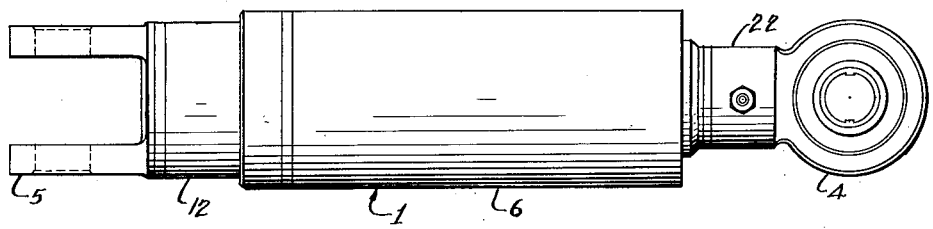
FIGURE 2 is a smaller scale, plan view, taken looking down on the shock absorber of FIG. 1.

In the exemplary embodiment of this invention and as illustrated in the drawings, reference character 1 designates as a whole a preferred type of linear shock absorber which, as noted above, is intended to be used with its vehicle attached or stationary (piston) end up and with its lower (cylinder or barrel) end down and movable, as indicated by the legends in FIGURE 1.

As also shown in FIGURE 1, the generally stationary and uppermost piston portions or the piston sub-assembly are indicated as a whole by numeral 2. It is to be noted that the reservoir, which is designated as a whole by 8, is preferably rigidly connected to move with the piston portions 2 and thus forms a part thereof to receive, and supply, hydraulic fluid in and out through the hollow piston rod.

The movable and lowermost cylinder or barrel portions or the cylinder sub-assembly parts are indicated as a whole by the numeral 3.

The piston parts 2 have, at their upper end, means to connect the unit to a vehicle or like such as the enlarged eye forming member 4, having the usual and well known type of bushing therein.

Similarly the lower end of the cylinder portion 3 has the, preferably, integral eye forming extension 5, having the usual bushing.

The piston portion 2 includes, and has rigidly attached thereto, a stone shield or outer cylindrical sleeve embracing or surrounding the cylinder. A lower stone shield scraper-bearing 7 comprises a heavier or thicker ring secured as by welding, and as shown, to shield 6. A scraper and seal member 10 of suitable material such as phenolic fiber is mounted in a corresponding groove in member 7 to engage the outer wall 12 of the barrel or cylinder, which is rigidly secured at its lower end, as by welding as shown, to the shoulder 14 formed by the annular recess or cut-away portion 15 of the lower barrel end or closure plug 17.

The inner cylinder or barrel wall 18 preferably is tightly fitted into the outer wall 12 and this inner wall 18 is rigidly secured as by welding edge, as shown, to the recess portion 15 of the lower barrel closure 17.

The upper end of the outer cylinder wall 12 is suitably secured, as by welding as shown, to the inner cylinder wall 18 inward from its upper end. The upper end of stone shield 6 is suitably secured, as by welding as shown, at 25 to the upper face of the annular ring or end closure 23.

Annular member 23 is similarly secured, as by welding as shown, at 24 to the piston rod forming sleeve or cylinder 21. This sleeve is secured by welding, as shown to the upper or stationary rod end plug or closure 20 which may be integral with eye 4.

Member 20 has two axially spaced, threaded, and preferably diametrically opposed holes 30 and 31 therethrough. Adjustable screw plugs 32 and 33 respectively, are threaded in these holes. These plugs are provided with engaging means such as a screwdriver kerf at their outer ends and, preferably, have conical inner ends as shown. These conical inner ends engage the correspondingly sloped, or cam, surfaces 35 and 36 respectively. These conical, cam slopes are formed by a groove or recess cut into the rod extension 38, which is rigidly connected to the solenoid, indicated as a whole by numeral 37. This cylindrical, extension rod 38 is slidable, and snugly received, in bore or recess 41 which extends part way through to the outer end of member 20. As shown, rod 38 has a suitable seal means 42 comprising, for example, an O-ring and a back up ring.

As shown, member 20 also has an offset but axially extending bore or passage 43 (which does not extend through to the outer end thereof) to provide a passage for the flexible connecting wire or wires 44 and 45 for the solenoid 37. These wires extend out through means, such as the axially hollow, plug 40 threaded in at 29. It will be understood that while two wires are shown, one of these wires is intended to be used as a ground wire, and is to be suitably connected to any adequate ground. Thus, only one wire need be used if the solenoid is to be grounded to the structure of the damper unit itself. The ground wire 45 may be grounded to any suitable point, which in my exemplary embodiment, is inside of the connecting plug 40. Thus, only one live wire 44 needs to be connected to the outside of the plug 40. This outside wire 44 has relatively little motion since it need only swing with damper unit as it pivots or swings about its pivotal connection at 4.

As is well understood by those skilled in this art, the solenoid 37 has the usual internal, axially movable plunger (here unillustrated). Through the left hand side of the casing of the solenoid 37 (as seen in FIGURE 1), there is a suitable central opening through which a solenoid plunger, extension rod 46 extends, being suitably and rigidly connected to the unillustrated solenoid plunger to move therewith. Rod 46 is rigidly connected, and is here integral with, the orifice controlling valve 47 which is at its lefthand end. A collar 48 is suitably secured on rod 46 as by the through pin 48a, and a compression spring 49 acts between collar 48 and the casing of solenoid 37 to serve as the solenoid return spring and to hold rod 46 and valve 47 in their extended or maximum length position.

Portions 38, 37, 46 and 47 of the valve and its actuating rod are designated as a whole by the numeral 50.

The inner or lower end of the piston rod sleeve 21 is internally threaded as at 21a. These threads are secured over a correspondingly threaded and reduced diameter portion 51 of the piston end member 52. These threads may be locked as by a piston thread, lock pin 53 extending through matching holes in these two members.

Figure 4:
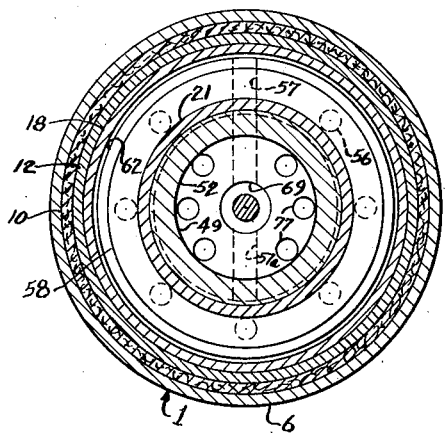
FIGURE 4 is a sectional view taken in the plane as shown by IV—IV in FIGURE 1.

This piston or end member 52 has, inwardly from its upper end, a shoulder or face 55 facing upwardly and having a plurality of spaced, parallel, and axially extending holes or bores 56 extending therethrough as shown in FIGURES 1 and 4. It will be noted that the ring, or peripheral series, of holes or bores 56 has a gap at the very top so that there is no holes or bore 56 at the top to interfere with the radial bore 57, which extends from the upper side of end member 52 (as seen in FIGURE 1) merely through to its outer side or surface.

A compression check valve 58, in the form of an annulus or ring, is seated against shoulder 55, and closes the upper ends of holes 56 when the valve is in its closed position. This valve is retained in position by being held between the shoulder 55 on the screwed in piston end 52, with a clearance up to the outwardly projecting portion of piston rod sleeve 21.

The radial bore 57 opens in through the reduced diameter portion 62 of the piston end which provides a clearance or liquid entry passage to communicate this radial bore with the upper piston space or chamber 60.

Adjacent to this reduced portion 62 is the full diameter portion 63 of the piston, engaging the inner walls of the cylinder sleeve 18 and having a suitable piston seal mounted in a groove therein as shown at 64. The lower end face 67 of the piston acts against the lower piston space 66 closed by the lower end of the cylinder structure. The piston member 52 has an axial central bore 69 extending therethrough from end to end and having a lower enlarged, and threaded, portion 70, in which is secured, the correspondingly threaded portions 71 of the end closure and check valve retainer member 73.

Radially inward from the holes 56 there is another circle of holes or axial bores 77, which extend through from end to end of the piston to the lower end shoulder 78, on which is seated the rebound or extension, check valve or foot valve 79, which is in the form of a ring or flat annulus and controls communication through the holes or bores 77.

It will be noted that valve 78 is retained in position by the axially spaced enlarged portion 74 on the threaded-in removable end closure 73.

It is to be noted that the orifice adjusting or controlling valve 47 has a closely fitted, lap fit in the bore 69 to prevent leakage and to control the area exposed when this valve 47 intersects, and partly covers, the transverse or radial bore 57. The valve 47 has a generally axially extending (but preferably angular) bore 80 therethrough to vent the lower and otherwise closed end of bore 69, to thus permit free movement for the valve 47 during adjustment or during solenoid operation.

The lower end face 67 of the piston has a cylindrical annular recess 81 extending upwardly therein and including the reduced portion 82 as shown. The cylinder end portion 17 has the reduced annular extension 83 loosely received (at its inner and outer peripheries) in this recess 81 to provide an additional damping or cushioning due to the substantially trapped liquid at the collapsed end of the stroke or when the cylinder is in its upper position.

A transverse or radial bore 84 communicates the end space on the inner and outer sides of extension 83.

Preferably, in the inner part of the upper end of cylinder end 17, there is a hole or recess 85 in which is suitably secured a ball retainer 86 resting on the shoulder provided by the reduced diameter passage 88 which has at its lower end a part spherical seat opening into the reduced diameter passage 89. The ball check valve 90 cooperates with this seat to give a one-way valve action for the air bleed, as is well understood in this art. Passage 89 communicates with a transversely intersecting (and preferably angular) passage 91 extending in from the outer side or surface of cylinder end 17 as shown. This passage 91 communicates with an air bleed annulus 92, which is enclosed by the outer cylinder. This annulus 92 communicates with a very small helical passage 139 between the inner and outer cylinder walls 12 and 18.

This air bleed helical passage 139 is cut or machined into the outer side of the inner tube or wall 18 of the double wall cylinder, so that it is closed on its open outer side by the outer wall 12. This helical passage 139 is shown, at the upper end of the cylinder structure, as communicating with the rod gland air bleed passage 107 so that it extends as a helix around, and throughout the length of, cylinder 18 to connect passages 92 and 107.

As shown in FIGURE 1, the upper end of cylinder sleeve 12 may be suitably secured, as by the welding at 12a to the cylinder sleeve 18, inward from its upper end. The upper inner end of the inner cylinder sleeve 18 is internally threaded at 97 to receive the correspondingly threaded portion 98 on the annular, upper cylinder end closure 95, through which tubular piston rod 21 is sealingly slidable. Seal 105a comprising an O-ring and backup ring in a suitable groove on 95 acts on the inside of 18.

At the upper end of this closure 95 there is an enlarged annular recess 99 having in a larger diameter groove and, in order from the top down, a rod scraper retaining ring 100, a rod scraper, ring 101 of "Teflon" or the like, and a scraper ring backup washer 102. In the inner or lower, reduced diameter end of the recess 99 there is mounted a rod oiler or felt wiper 103. Threads 97 and 98 may be locked as by the thread lock screw 105, secured through suitable openings in the corresponding two members.

Intermediate the length of the member 97 there is a suitable, rod engaging seal means 107a comprising a Teflon cap seal backed up by an O-ring in a corresponding groove.

At the lower, rod engaging end of member 95 there is an annular recess which is internally threaded at 111 to receive the corresponding threads 110 on the rod seal ring, retainer nut 109 which secures in place the removable inner and outer rod seal rings 113.

It is to be noted that the lower end of member 95 has rigidly secured thereto, and preferably integral therewith as shown, the sleeve extension or rebound snubbing valve skirt 115 which tightly engages the reduced diameter portion 62 and closes off the outer end of the transverse passage 57 at the upper end of the rebound stroke or when the damper is fully extended.

It is to be noted that a somewhat similar end snubbing action is given at the other end of the stroke by the compression snubbing valve or extension 83 which enters, and substantially closes off the annular recess 81 and thus substantially closes off the passage 82a communicating the inside of the hollow piston rod 21, through transverse bore 57a to the lower end of the piston.

Figure 3:
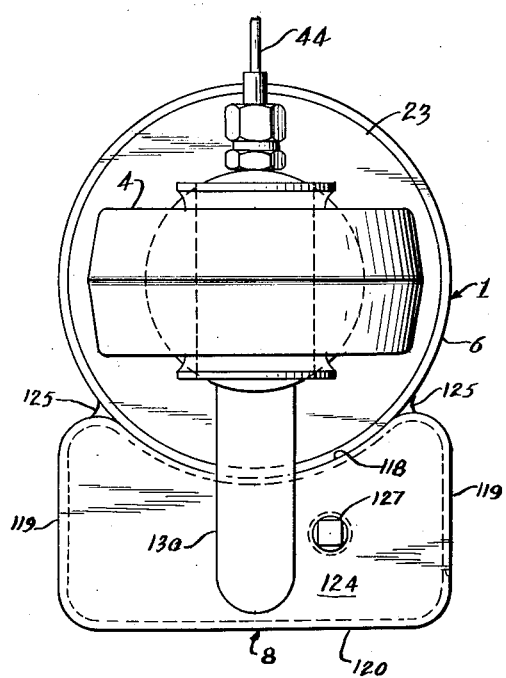
FIGURE 3 is an end view, taken looking from the right in FIGURE 1.

The piston portion designated as a whole by 2, includes as a part movable therewith, the reservoir designated as a whole by 3. This reservoir, as shown in FIGURE 3 taken with FIGURE 1, may be of generally upright and rectangular form. It has an inner, curved wall 118 engaging a part of the periphery, and matching the curvature of, the stone shield 6. This reservoir may be formed from sheet metal in any suitable or conventional fashion. It includes the two side walls 119, which are preferably integral with the curved rear wall 118. It also includes the suitably connected sheet metal front wall 120, the bottom closure 121 and the heavier or thicker top closure 124, both of these end closures being connected by welding as shown.

Extending through, and suitably secured in, the top closure 124 is the fill level limiting tube 126 which extends down to the liquid level L, which is the liquid level for the fully compressed condition of the damper, as it is shown in FIGURE 1. The upper end of tube 126 is closed by a suitable, and removable screw filler plug 127.

The lower or straight portion 129 of the liquid transfer tube also extends through, and is suitably secured in, an opening in top closure 124 and has its lower end 132 nearly at the bottom of reservoir 8. The upper curved portion 130 of this transfer tube bends around as shown and enters a suitable hole or opening in the upper, piston rod closure 20, in which its end, and passage forming, portion 131 is suitably secured, as shown by the dotted lines in FIGURE 1. Thus, the reservoir is in communication at all times with the interior of the hollow piston rod 21.

As shown in FIGURE 1, the inner end of the passage 57 is under the control of the side of the cylindrical valve element 47 to form the adjustable rebound control orifice 135. Similarly the radial passage 57a is under the control of the opposite side of the cylindrical valve 47 to form the adjustable compression control orifice 136. It is to be understood that while these two orifices may, if desired, be identical for a given setting or adjustment position of the valve 47, and which is here illustrated, yet the two passages 57 and 57a may be axially offset (or correspondingly the active sides of the valve 47 may be sloped or axially offset) to provide unequal areas for these two orifices to thus, if desired, provide for a difference of damping action between the compression stroke and the rebound stroke.

It may be noted, that in FIGURE 1, approximately ⅓ of the interior or active length of the cylinder is broken away to reduce the size of the drawing. As an example, the embodiment illustrated has an extended length of 26.5 inches and a compressed overall length of 18.5 inches with the interior diameter of the cylinder being a little over three inches, as shown.

*Operation*

In normal operation, and starting from the compressed condition as shown in FIGURE 1 and with the liquid level in the reservoir as indicated at L, as the shock absorber is extended, as on the rebound stroke, liquid from the reservoir 8 will flow, or be sucked, up through the transfer tube 129, 130, 131 into the interior of the piston rod 21. From the piston rod this liquid will go through the axial bores or passages 79 and then through the one-way or rebound check valve 79 into the lower end of the cylinder to fill the void caused by displacement of the rod as it is raised or withdrawn from this lowermost part of the working chamber. It is to be noted that all of the passages through which this flow takes place are the size to give a pressure drop of from five to ten pounds per square inch (and not more) under the most rapid extension stroke that is encountered in service.

During, or simultaneously with, this replenishing flow action from the reservoir 8, there is another damping flow. This second, or in parallel, flow is from the expansible chamber 60 (that is, the outer and upper part of the working chamber) over the outside of the reduced portion 62 of the piston and through the radial passage 57, through the rebound orifice 135, into passage 69, from thence through passage 77 and the rebound check valve 79, to the lower end of the cylinder.

On the compression stroke, the flow is similarly divided into two parts which may be half and half. This percentage depends upon the ratio of the piston area to the rod area, which is here one to two. It is to be understood however, that other ratios may be had by changing this relationship. Part of the restricted compression stroke flow is up through the piston ports 56, past the then open, compression check valve 58, and so into the interior of the expansible chamber portion 60. The other part of the flow is up through the damping orifice 136. It is supplied to 136 by transverse passage 57a and passage 82 leading into the space 81 and from thence to the lower end of the cylinder. Flow through the damping orifice 136 goes up into the inside of the hollow piston rod and from thence through the transfer pipe 131, 130 and 129, into the reservoir 8. During this action it will be understood that passage 57a is communicated to the recess 82 by passage portion 82a.

It will be understood that the damping strength in both directions is selectively or adjustably controlled by the axial position of the lockout valve plug or orifice valve 47. This adjusted position is achieved by a differential movement of the variable orifice adjustment screws 33 and 32. It will be understood that either of these screws can be loosened, to thus permit adjustment of the other one. After such adjustment, the first screw is tightened up to act as a locking means for the adjusted screw. It will also be understood that the conical slopes on the inner ends of the screws are the same and cooperate to give a flat engagement against the matching conical slopes 35 or 36, which last slopes are spaced apart a distance to match the axial center-to-center distance between said screws. It will be noted that these screws, in which one provides a locking means for the other, thus provide an intimately fine adjustment, and prevent any lost motion when they are both tightened up.

In this adjustment, an elongation or extension of the elongated adjusting means, designated as a whole by 48, results in an opening, or increasing of the areas of, both of the adjusting orifices 135 and 136. This decreases the damping strength in both directions of motion.

Conversely, the shortening or contraction of elongated adjusting means 48 reduces the damping strength by partially closing off orifices 135 and 136. Thus a major, or much larger, shortening of the elongated adjusting means 48 is achieved by the solenoid 37 which shortens this unit when its plunger is pulled in to compress the spring 49 and thus temporarily, and while its current is on, holds both orifices 135 and 136 closed. In this connection it will be noted that the valve member 47 has an adequate axial length to permit this extra, solenoid actuated, motion and the complete covering of both of the ports or areas at 135 and 136.

Since, as noted above, the ground wire for the solenoid may be grounded at any suitable point, or in the plug 40, only one wire 44 (a live wire) need be led to the conveniently located actuating switch to make or break the connection to the usual battery or the like. However, it will be understood that two wires may be employed here if desired. Thus these two wires, or the one wire, need have only a swinging connection (to match the swinging about the pivot 4) which their flexibility readily permits. No motion with the up and down motion of the lower part of the damper is required of these wires. This contributes to their long life and prevents service difficulties.

When the piston rod is fully extended the rebound snubbing valve skirt 115 enters the clearance space 62 and closes off the outer end of the radial passage 57, to thus stop the piston for the last part of its travel, which in my preferred embodiment is approximately ½ inch.

Similarly, on the compression stroke, snubbing action is given by means of the snubbing valve extension 83, as described above.

If any air collects outside of the hollow piston rod 21 during the extension stroke, a minute quantity of air and oil will be forced past the metal piston seal ring 113. This two-piece metal seal ring does not give a dead-tight seal and thus permits slight leakage out through port 107 into annulus 139. This annulus in turn is connected with second or lower annulus 92 at the lower end of the moving cylinder by means of a helical passage cut into member 18 on its outer wall and extending for the full length thereof between these two annular passages. Thus the air goes from annulus 92 through passage 91, through check valve 90, and thus into the lower end of the cylinder. From here the air bubbles will rise up against the piston and enter the annular passage or space 82. From here they will go through the passage 57a, through orifice 136, and thus rise up through the hollow piston from which the air will be forced out on the compression stroke into the reservoir 8 through the liquid transfer and air transfer tube 131, 130 and 129. Since this air bleeding system operates continuously as the shock absorber works, all of the air will, in time, be pumped into the reservoir or into the top end of the hollow rod where it cannot interfere with the damping function of the unit.

It will also be noted that the phenolic fiber ring 64 prevents dirt from accumulating in the space between the barrel and the stone shield. The preferably "Teflon" scraper 101 keeps the piston rod scraped clean of any dirt that might pass the scraper ring 10. The felt ring 103 serves as an oiler to keep the rod and scraper lubricated.

It is to be understood, that while the several improved features of my invention have been illustrated and described in only one exemplary embodiment, which is a linear type damper having a particular and preferred structural arrangement, yet these improved features may be used to advantage in other types of dampers, and various other modifications and variations of this invention may be made, without departing from the spirit and scope of the novel aspects thereof and as defined in the appended claim.

I claim as my invention:

A vehicle shock absorber of the linear type comprising a cylinder, a damping piston reciprocable therein and secured to a cylindrical hollow connecting rod extending up and out through the upper end of said cylinder when said shock absorber is fully compressed, damping orifice means movable with said piston and cylinder and including axially movable valve means to vary the damping strength of said shock absorber and an elongated valve actuator extending along the length of, and inside of, said hollow connecting rod, means to secure the outer and upper end of said actuator to said connecting rod and to permit external manual adjustment of said axial secured position comprising two axially spaced and radially extending adjusting screws extending inward through said always exposed upper end of said hollow connecting rod and cooperatively engaging two opposed slope portions on the upper end of said elongated actuator, and remote controlled motor means, intermediate the ends of said actuator, comprising a two-position solenoid to change the effective length of said connector and thereby control the damping of said shock absorber, said solenoid being grounded to said shock absorber and requiring only one wire connected to be energized and swingably extending from a non-reciprocating upper end of said shock absorber.

References Cited in the file of this patent

UNITED STATES PATENTS

| | | |
|---|---|---|
| 2,507,276 | Skwaryk | May 9, 1950 |
| 2,574,209 | Funkhouser | Nov. 6, 1951 |
| 2,720,944 | Girard | Oct. 18, 1955 |
| 2,745,517 | Zook | May 15, 1956 |
| 2,757,762 | Carbon | Aug. 7, 1956 |
| 2,815,100 | Carbon | Dec. 3, 1957 |
| 2,875,867 | Lucien | Mar. 3, 1959 |

FOREIGN PATENTS

| | | |
|---|---|---|
| 1,073,901 | France | Mar. 31, 1954 |
| 1,097,456 | France | Feb. 16, 1955 |
| 1,130,621 | France | Oct. 1, 1956 |
| 664,770 | Great Britain | Jan. 9, 1952 |
| 530,282 | Italy | July 6, 1955 |